United States Patent [19]

Niguette, III

[11] 3,938,097

[45] Feb. 10, 1976

[54] MEMORY AND BUFFER ARRANGEMENT FOR DIGITAL COMPUTERS

[75] Inventor: Reaman Paul Niguette, III, New Canaan, Conn.

[73] Assignee: Xerox Corporation, Stamford, Conn.

[22] Filed: Apr. 1, 1974

[21] Appl. No.: 456,537

[52] U.S. Cl. ............................................. 340/172.5
[51] Int. Cl.² ........................................ G06F 13/00
[58] Field of Search ...................... 340/172.5; 444/1

[56] References Cited
UNITED STATES PATENTS
3,618,040  11/1971  Iwamoto et al. ................. 340/172.5

OTHER PUBLICATIONS
Morenoff et al., "Application of Level Changing to Multilevel Storage Organization" Communications of ACM, Mar. 1967, pp. 149–154.
Opler, A., "Dynamic Flow of Programs and Data Through Hierarchical Storage" Information Processing, 1965, Vol. 1, pp. 273–276.

*Primary Examiner*—Gareth D. Shaw
*Assistant Examiner*—Michael C. Sachs
*Attorney, Agent, or Firm*—Ralf H. Siegemund

[57] ABSTRACT

Random access storage facilities for the CPU of a computer are cascaded in that a facility of relatively fast access speed holds a subset of information held in a facility of lower speed. Memory read requests are applied sequentially to these storage facilities, beginning always with the one of highest access speed, while requests satisfied by a lower speed facilities lead to storage of that information in all facilities of higher access speed. Write requests are made only to one facilities of lower speed, with algorithmic updating of the facility of lowest speed while the ones of higher speed are updated only on subsequent read requests for the same location. The several facilities which can be updated make storage space available on the basis of usages. The specific example explaining the invention has a conventional random access memory, a CPU associated cache and an buffer interposed between cache and memory with speed access ratio of 9:3:1, and cache and buffer sizes respectively leading to less then 50% cache access misses and less than 10% buffer misses, the average access time is better than half the access time of the memory alone.

27 Claims, 4 Drawing Figures

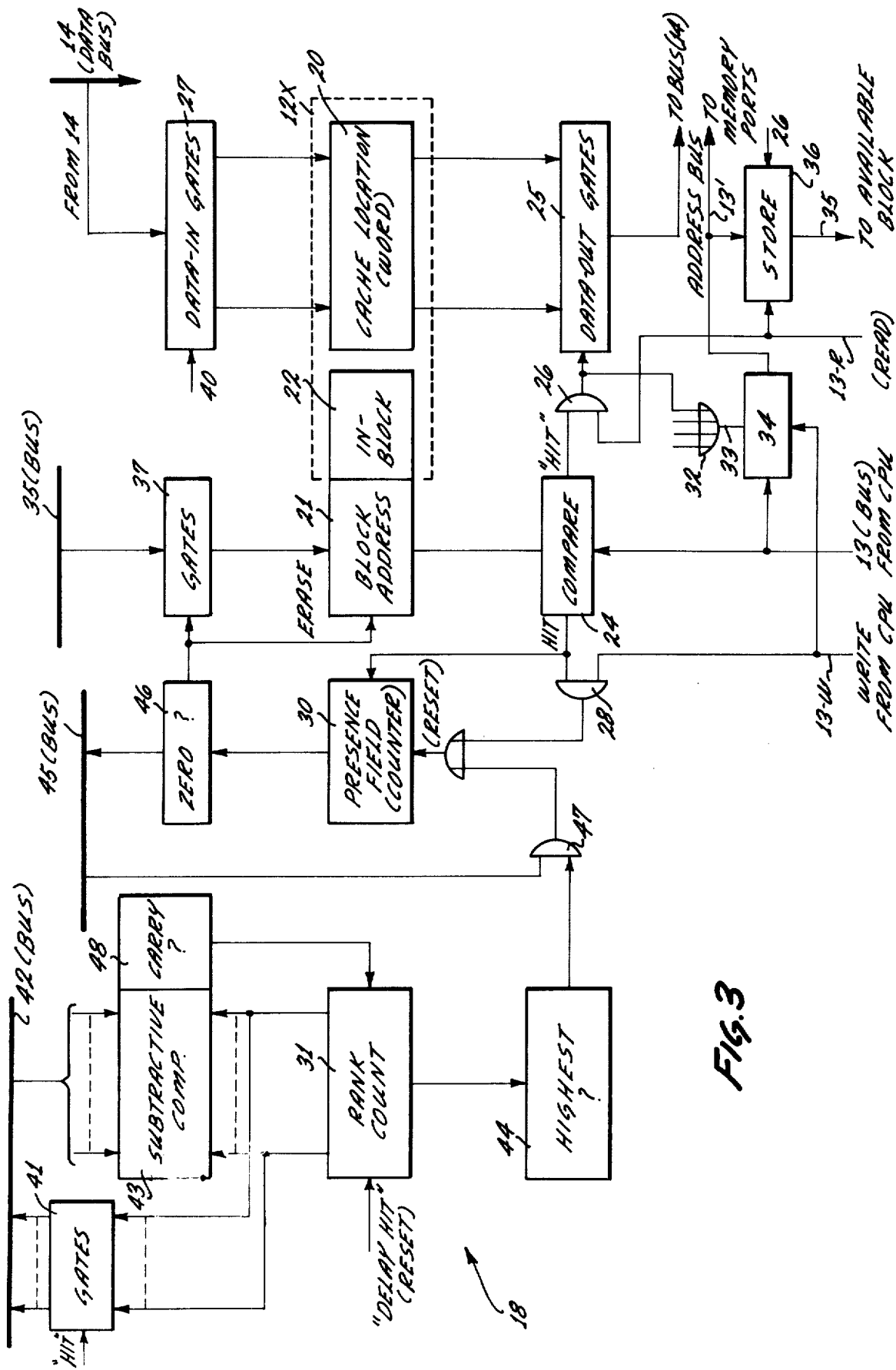

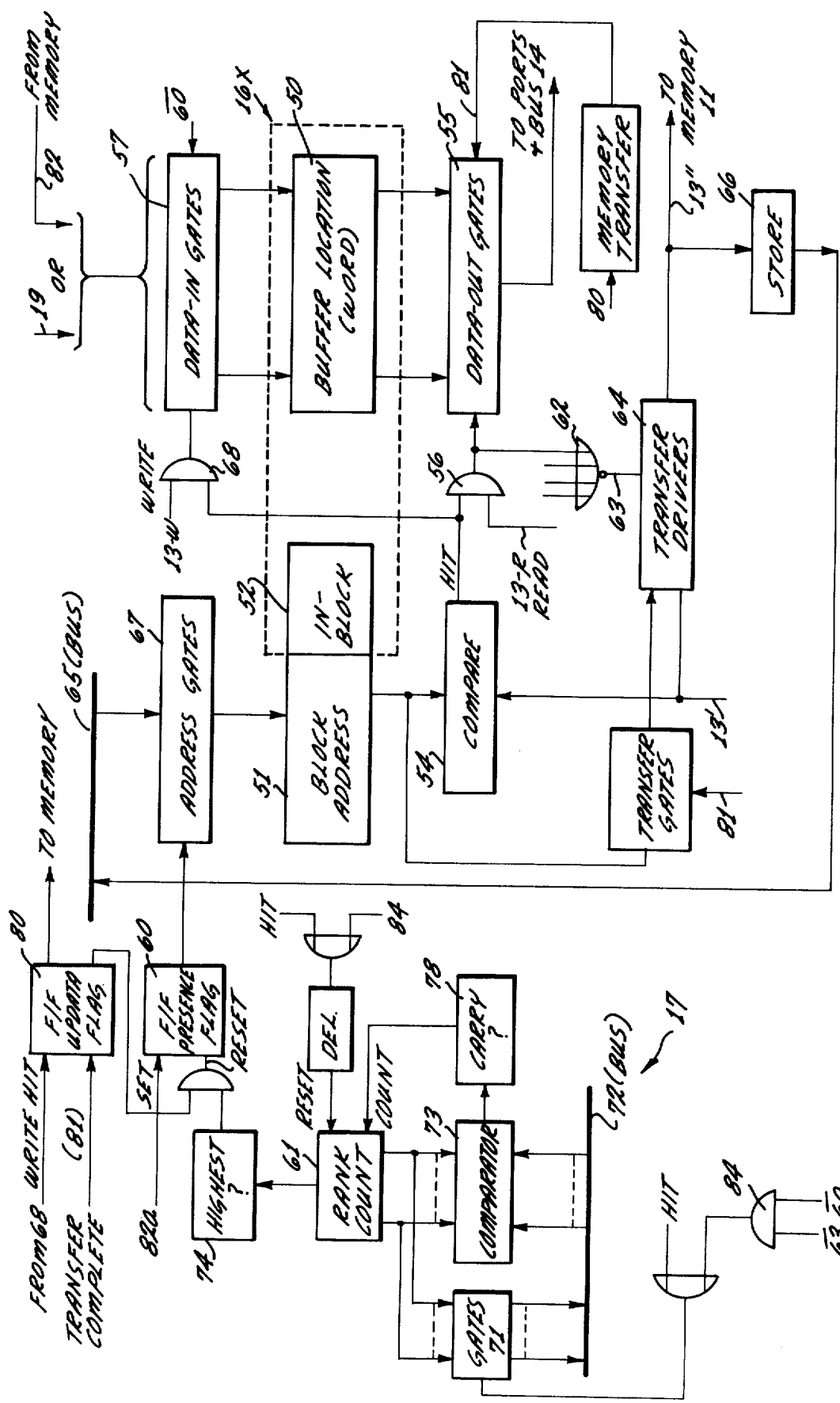

MEMORY AND BUFFER ARRANGEMENT FOR DIGITAL COMPUTERS

BACKGROUND OF THE INVENTION

The present invention relates to improvements in a digital, stored program computer and more particularly to improvements in the handling of traffic of information between a computer memory and its processing facility including the circuitry which performs arithmetic and logic operations on data.

The speed of a computer is primarily determined by access speed to information that is to be processed and by the speed with which processed information can be stored for safe keeping until needed either for further processing or for outputting. Since any storage facility must be capable of storing individual bits of information, e.g. binary bits, the fastest computer conceivable is obviously one whose memory is composed of storage elements to the bit level incorporating the highest available technology as to access speed. A single TTL flip flop has access times in the vicinity of 10 nanoseconds, emitter coupled flip flops require only about half that time. Of course, a random access memory constructed from such elements will have additional gating and decoding delays, minimized, however, by maximum speed electronics.

A computer having exclusively such elements as storage facility would not only be fast, but also frightfully expensive because the cost per bit is about hundred fold the per bit cost of a conventional core memory. Therefor, large random access memories as needed in computers cannot use normally storage facilities considerably more expensive than magnetic cores.

SUMMARY OF THE INVENTION

It is an object of the present invention to provide for a new approach in the handling of data flow and requests for access to stored information as between a processing unit and the main random access memory, while the average access speed to information is improved considerably but at modest cost.

In accordance with the principles of the invention it is suggested to interpose a cascade of random accessible buffers between memory and CPU with the buffer closest to the CPU having highest access speed (preferably the highest access speed with available technology) and smallest size; a buffer closest to memory being larger and having correspondingly slower access speed (and being cheaper accordingly). Each buffer contains normally a subset of the information held in the next storage facility in the cascade as "seen" towards the memory. Each buffer is randomly accessible by memory addresses, and a read request is satisfied by that one of the buffers being, relatively speaking, closest to the CPU among those having the content of that particular location available. A read request that has been unsuccessfully made to a buffer close to the CPU and which leads to a buffer farther away, or even to the memory itself, will not only be satisfied from that source, but the buffer or buffers closer to the CPU receive a "copy".

Updating the content of the buffer located closest to the CPU is made on the basis of blocks, each block including a plurality of locations, one of which being the one accessed. Buffer space is made available for such storage on the basis of criteria relating to frequency and/or recency of use. Memory access request for purposes of storing are ignored by buffer or buffers close to the CPU and lead to storage in a buffer close to memory for subsequent transfer to memory on a low priority basis.

The invention is based on the discovery that, strictly on a statistical basis, not too often is a request for access to a memory location made just once. This has to do, for example, with the fact that many instructions are branch instructions and on the average 75% of all instructions executed in the course of the program are unsuccessful branches. As a consequence, a 1 kiloword buffer, for example, will satisfy seven out of eight access requests or, to say it differently, only one out of eight access requests will lead to a slower access speed facility so that the effective or average access speed is drastically increased.

The cascading of random accessible buffers of different sizes, amounts to a cascading of technology from a practical point of view. Little is gained by making the technological steps too fine; that is to say a fast access buffer should in fact exhibit significantly faster access than the next buffer in the cascade. The access speeds of sequential buffers in the cascade should be further apart than by a factor of 2.

In view of the fact, that a CPU associated cache may be constructed to have a faster access speed than 100 nanoseconds, while core memories exhibit access speeds of about ¾ to 1 microseconds, a cascade of two buffers is a practical approach, one being a CPU associated buffer or cache of fastest possible access, and one being constructed of elements having an access speed in between that latter speed and the access speed of a core memory. MOS buffers for example have an access speed of a few hundred nanoseconds.

By way of example, if the access speeds are staggered at 1:3 ratios, even a small cache with a hit rate about 50% or better, and a buffer with a 90% hit rate reduces the average access time to less than one half the access time to the slowest memory facility in the cascade. The term "hit" rate denotes the percentage of successful access requests to the particular buffer.

Considering a two buffer cascade further, the CPU associated buffer or cache, should satisfy only read requests, while the memory associated buffer serves also for write requests arriving from the CPU and leading to memory locations regardless of whether or not they are already represented in that buffer. Read request will be honored by the buffer only to the extent they have not been successfully made to the cache, provided, of course, the particular location is represented in that buffer.

Communication between the CPU - cache - buffer subsystem on the one hand, and core memory on the other hand will be restricted to infrequent communications concerning those access request which could not be satisfied by the cache-buffer system as well as to storage in memory of information in the buffer which has been updated and there is danger that such information is going to be obliterated for reasons of a need for buffer storage space. From that point of view, access speed to memory becomes almost a second order parameter which means that a low cost core memory may well suffice. For example, when less than 5% of all access requests by the CPU will actually lead to memory, a low cost memory with access time of 1 microseconds or even longer will hardly deteriorate performance based primarily on buffer and cache access times.

As stated above, storage space in the buffer is made available on the basis of likelihood of further use. One can use here different criteria, but presently the best criteria are frequency and/or recency of use, on the basis of the assumption that, for example, information that was not used for a relatively long period of time may not be used further in the near future. Similar criteria can be used for making storage space available in the cache.

In an larger system multiple processors may be connected to the memory so that the buffer serves the different processors independently. Since either can update the memory and buffer content independently, steps must be taken to prevent using the content of a cache location the corresponding buffer location of which has been updated otherwise. A convenient way of handling this situation is to prevent too frequent usage of the same cache location or cache block and to force access to a buffer location from time to time. The same feature avoids also the following; frequent use of a cache location means that the same location in the buffer is not used. However, if a cache location is used only for a certain number of accesses, and thereafter the buffer location with the same content is accessed, the usage status of this particular buffer location is updated accordingly.

It is convenient to organize the memory, the buffer and the cache into blocks each having plural locations to the word level. The data transfer between cache, buffer and memory may then be carried out on a block basis.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a block diagram of a cache location to the word level with additional components relevant to the location and pertaining in parts to the block of that location, in parts to the buffer as a whole; and FIG. 4 is an analogous block diagram for a buffer location.

Proceeding now to the detailed description of the drawing, FIG. 1 is an overview of a system depicted in major building blocks. The computer system includes a central processing unit 10 or CPU, performing the basic arithmetic and logic operations pursuant to a store program. Data and instructions of the program which is being executed, are contained in a memory 11 of the random access variety, such as a core memory with an access time of about ¾ of a microsecond.

Figure 1:
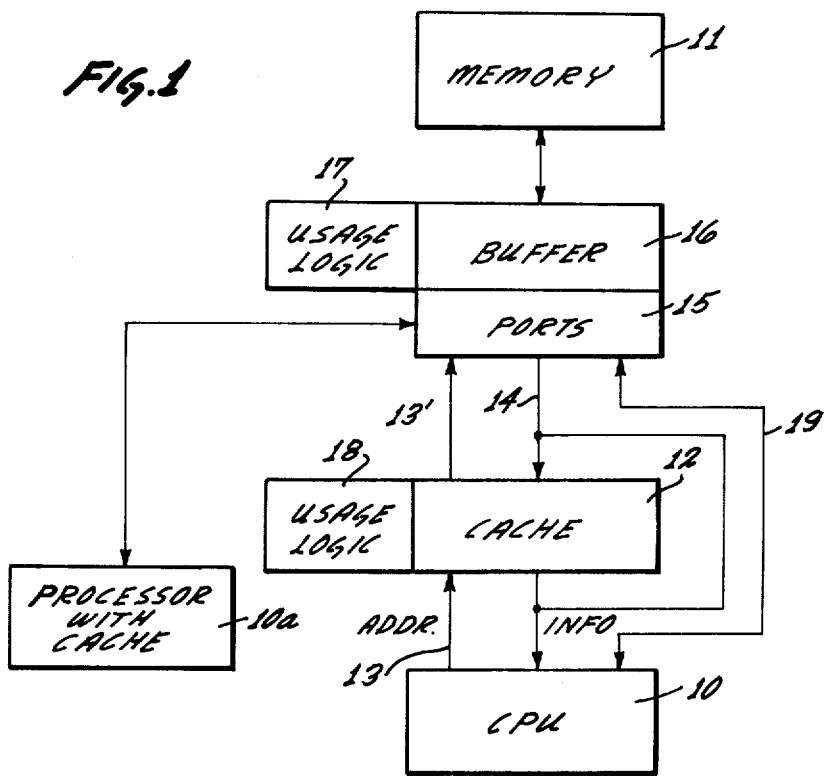
FIG. 1 is a broad layout of the basic components of an example of the preferred embodiment of the invention, with a cache and a buffer interposed between memory and CPU of a digital computer.

It is assumed that the memory 11 is addressable to the word level with a particular number of bits per word being made available by the memory upon addressing a location, or such an addressed location is capable of receiving the bits of a word for storage. The memory may be constructed from several, parallelly operating and independently addressable banks, each bank holding different locations with the address continuum of the system. See for example U.S. Letters Patent No. 3,702,462 of common assignee.

The computer system may include additional memory facilities, such as RAD in a head per track configuration, and other disk files with movable are and/or magnetic tape units for bulk storage. These memory extensions are not shown here in detail except that in representation of these peripheral systems a processor 10a is shown servicing for example one or several units of peripheral equipment as an input/output processor and requiring occasionally demands for access to memory independently from the demands made by the CPU 10. A larger system of this nature is shown in said U.S. Pat. No. 3,702,462.

The basic computer operation involves (as always) the transfer of information between CPU and memory pursuant to the program being currently executed. Pursuant to that operation, the CPU generates memory access requests, usually to the word level at any instant, either for extracting information from that memory location (data or instruction) or for causing information to be stored in that location.

A novel subsystem is now interposed between CPU 10 and memory 11. The subsystem includes a relatively small storage facility called a cache 12, but permitting random access at a very high speed, such as significantly below 100 nanoseconds. The general idea to be realized here is to have the CPU associated with a small size buffer constructed as random access memory and using storage elements with the fastest access speed technology permits. Generally speaking, one could say that the speed of access to any of the locations of this cache buffer should be the same or about the same as the access speed to operating registers in the CPU.

Each memory request from the CPU is first made to the cache facility 12 via an address bus 13. If the particular memory location (definitely represented in memory 11) is also represented in cache 12, and if the request is a read request, the content of that location is extracted and fed to the CPU via data bus 14. If the CPU makes a memory request for purposes of transferring information presence of the particular location in cache 12 is ignored.

If the cache 12 does not contain representation of the particular memory address, or if the request was made for purposes of transfer of information from the CPU to memory, the cache 12 signals a "miss", and the address is placed on the address bus 13', that leads to memory 11. The memory may have, for example, a Port structure 15 permitting plural memory requests, made asynchronously by the CPU and other processing facilities (IOP's) such as 10a, to be handled more or less simultaneously on a priority basis as explained for example, in U.S. Letters Pat. Nos. 3,702,462 or 3,603,935. Each memory bank has its own port and systems, and the various busses are daisy chained from port to port.

Usually, a memory request when being put through the port system leads directly to the particular memory location (in the appropriate bank); however, the buffer subsystem includes a buffer memory 16 being, for example, of the LSI variety with access time in the order of 200 or 300 nanoseconds or there-abouts. If the core memory is distributed in several banks, each with its own port system, a separate buffer 16 may be associated with each bank. The reason for this is that the port system includes facilities identifying the subcontinumm of memory addresses specifically represented in the particular bank. The buffer or and in that bank may have duplicate information of those memory locations which are included in that bank. Presently, however, it is convenient to consider a single memory, a single buffer and a single port, because memory access as seen from the CPU does not take cogniscance of the bank structure.

A memory request passing through the ports 15 turns always first to the buffer memory 16 to determine whether the particular location is represented there. If that is the case, information is taken from the location, or is provided thereto as the case may be, and the memory 11 is again ignored at that point. It is specifically noted that the buffer 16 will accept memory write-in requests, while cache 12 does not.

If buffer 16 does not contain the particular location either, then and only then is the memory accessed (buffer miss), but only in the case of a memory read-out operation. In the case of a store-in-memory operation when assumed to be the purpose of a memory request, the information as set by the CPU on data bus 19 is stored in buffer 16, regardless of whether or not the particular location is already represented in the buffer. If the location is not yet represented, one of the least used buffer locations is selected for storage.

Information which has been taken from the buffer 16 or from the memory 11, is provided to the CPU via data bus 14, and, parallelly thereto, the same information is written into a cache location made available for that purpose; if the information had to be taken from memory the same information is also written in an available buffer location. Thus, any memory read request that could not be honored by cache 12 or by buffer 16, leads to the direct providing of the information to the CPU from whatever source it can be taken, while additionally storage space is made available in cache 12 and buffer 16, or just in cache 12 as the case may be, to store the same information together with the specific memory address from which it was taken.

The last mentioned aspect requires more consideration and leads to considerations of updating buffer and cache. Each request for access to a memory location which arrives at buffer 16 but that leads to a miss is used as cause to eliminate e.g. a portion of the buffer on the basis of least recent usage. The block 17 in FIG. 3 denotes generally logic circuitry which keeps track of the use that is being made of the several locations in buffer 16. This includes determination of buffer locations which have been used less recently e.g. least recently as compared to other buffer locations. A use is to mean here an access request by the CPU to the particular location.

If there was a memory-read request that has lead to a buffer access miss, so that the information had to be taken from memory, that information is not only returned to the CPU, but also stored in a buffer location whose content has been used less recently than others. The buffer locations do not have fixed addresses, but access is provided on the basis of associative addresses; when a particular buffer location is being written into, the particular memory address code is likewise stored in association with the word that is being stored, so that subsequent access requests made to the memory system and concerning that particular location will lead to a buffer access hit, and the memory proper does not have to be accessed.

Analoguously, a word store request that does not find the particular memory location represented in buffer 16, will cause the word to be written into one of the least recently used locations, and the particular address code will be stored in the addressing register associated with the buffer location. Additionally, each buffer location, or group of locations, which has been written into is associated with an update flag to indicate that this location or group of locations is not available for elimination of its content until the updated information has been transferred into memory 10. This transfer does not have to be made right after a buffer location has been updated, but only until the location becomes one of the least recently used ones. Since updating is a use, a rather large time span is actually available for transfer from buffer to memory.

The situation is similar to some extent with regard to the cache. If a memory location was not represented in the cache, but information had to be fetched from the buffer or from memory, that information word is not only returned to the CPU, but written into one of the least recently used locations of the cache, together and in association with the memory address code.

However, information to be stored in memory is never written into the cache at that point. In other words, the CPU does not write into the cache when executing a store instruction. This holds true even if the memory location in which the CPU wishes to store information is present in the cache, but such a store request forces a miss in the cache which in effect eradicates the content of that cache location.

It should be noted, that memory and buffer content are not only updated from the CPU, but also from peripheral equipment. Thus, processor 10a writes occasionally into the memory and buffer system. Therefore, it is desirable to limit usage of the cache and to go occasionally to the buffer if it has been updated in the meantime.

Logic 18 governs the cache as to which locations are available for write-in. Information is stored in cache 12 only after miss in a memory read attempt, when the information had to be taken from buffer 16 or from memory 11. Attempted write-in and/or least recent use are the criteria for the selection of a cache location as being available for write-in. The basic reason for not storing directly into the cache on CPU demand is to have the cache tuned by technology and not be algorithm. The cache 12 should be designed on the basis of immediate availability of its information to the CPU with no intervention or time sharing with procedure or transfer of updated information to the buffer 16 and/or memory 11. The only time the cache can be occuped otherwise arises when information is transferred to the CPU from the buffer or memory; these instances can be set aside exclusively for cache write-in because the CPU does receive already desired information at that point.

Four additional broad aspects are to be discussed in general terms with reference to FIG. 1. One aspect has to do with the format of the information transferred into the buffer and in the cache; a second aspect refers to the determination of what is exactly meant by least recent usage; a third aspect relates to the transfer of updated information from buffer to memory; and the fourth aspect refers to considerations of access timing.

The principle of the invention makes use of the fact that a memory location once accessed is rather likely to be accessed again, and that the content of memory locations having closely related addresses e.g. the next following addresses will be used shortly. Therefore, the cache is divided into blocks of, say, four word locations per block. The buffer is likewise divided into blocks, not necessarily of the same size, but conveniently so. Whenever a transfer occurs into the cache or into the buffer, not merely one word is being transferred but the content of the block to which the location pertains is transferred in its entirety. If the blocks in cache and buffer are of the same size, the content of one block in the buffer is transferred to one block location in the cache, while the content of but one location is transferred also to the CPU. A memory request that is a hit in the cache will see only one word transferred to the CPU. In other words, block transfers are limited to transfers from buffer to cache, and from memory to buffer and cache. In the case of transfer of updated information from buffer to memory, one must transfer the entire block if the updated flag identifies the block only and not the individual location. The transfer of the content of but one location can be effected only if each buffer location has its own update flag.

One can see that the block transfer can be carried out on the basis of a prearranged order or preassigned memory division into blocks or, in the alternative, a block can be defined ad hoc to include the location demanded by the CPU plus the three next ones. The latter definition of a block, however, can be chose only for memory to buffer and/or cache transfers, but not for buffer-to-cache transfers because block boundaries as far as address numbers are concerned, are most likely discontinuities in the buffer.

As far as the CPU operation is concerned, it makes little difference whether or not the blocks are predefined in memory 11. However, as far as the hit rate in buffer and cache is concerned, one can probably expect misses to occur somewhat less frequent when blocks are defined by algorithm and on an ad hoc basis, rather than by hardware, particularly as far as the extraction of information from memory 11 is concerned. Take for example any instruction, it is more likely that the instruction in the next location will be used shortly thereafter rather than a preceding one if instructions are stored in sequential addresses. Generally, programs procede on the average in one direction, even though there are numerous loops which constitute a kind of back tracking. Nevertheless it is more likely that locations are used in consecutive order than in an inverted order.

On the other hand using blocks on a preassigned (hardware) basis permits some hardware simplification. For example, a block may be defined to include those memory locations having the same address bits in all but the two least significant bit positions. Accordingly one can define a block address which in this case retains its validity throughout. If that division into blocks is additionally taken into consideration upon programming, the relative hit rates can be considerably improved beyond mere statistical occurances based on random appearances or requests. Therefor, a block definition by memory (hardware) division rather than algorithm will not necessarily produce a larger hit rate if that hardware division of the memory into blocks is taken into consideration by the programmer.

In either case it can be seen that cache and buffer receive, as a block, whatever the memory furnishes as a block, and as far as the cache/buffer — CPU communication is concerned, the algorithms related thereto remain the same whether or not one operates with block addresses. The block definition affects the transfer of information into cache and buffer only as to hardware i.e. whether or not a fixed format and block address can be defined for a block has only structural consequences.

It should be noted here that the term block has a double meaning. With regard to cache and buffer a block of locations is a definite, hardware reality, possibly identified by a block address which, however, is exchangeable because buffer and cache contain variable subsets of the information contained in memory. A block of information contains as many words as a (hardware) block has locations. An information block in one of the cache blocks is also contained in one of the buffer (storage) blocks as well as in memory, possibly even in a memory block if the location blocks are predefined already in memory by a block address.

In either case, information is always transferred between memory and buffer and cache in blocks of words, whereby location blocks receive and will contain subsequently complete information blocks as defined. It may be advisable to make the data path as wide as the blocks are in order to avoid consecutive transfers with compounded delays.

The second aspect to be considered refers to the determination of how space is made available in the cache and in the buffer for new information. Availability is defined on block basis in either case. The so-called usage logic circuits 17 and 18 for buffer and cache respectively perform the following functions:

Each location block in cache and each location block in memory is associated with a field of "recency of usage" bits, defining how long ago (in units of access requests made to the buffer or the cache) the respective information block therein has been used last. Whenever buffer space is needed for storing a new information block, the least recently used block (i.e. the one which was used for the last time longer ago than any other block) is deemed available. The same holds true for the cache and for block locations in the cache. These recency-of-usage bits as associated with each block can be deemed to establish an availability rank, whereby the block with the highest availability rank is the next one to be used for storage. Each block of the buffer has additionally a presence bit. That bit is reset when the block reaches highest rank, providing that the block does not contain information that was written in by the CPU but has not yet been transferred to memory.

A block in buffer 16 has additionally an update bit, indicating that the block has been written into pursuant to execution of a store instruction. That block is, therefor, not available, regardless of relative remoteness of usage, until the content of the block is written into the memory. The update bit is reset when such transfer has occurred, and that in turn permits the presence flag to be reset when the particular block obtains highest availability rank.

Another aspect to be considered, is the following. As stated, memory and buffer may be updated through operation of a peripheral equipment processor such as 10a. Thus, while the CPU operates repeatedly with a particular cache location, the corresponding buffer location has been updated in the meantime.

Obviously, the updating cannot occur in complete random relation to CPU usage of such information, but there must be a time relation and/or a programmed procedure signalling in advance such updating, or limiting ab initio information that may be updated in the course of the program independently from CPU operation. One way of handling the situation is the following: Each cache block can be accessed only for a specified number of times. Thereafter, a miss is forced and the CPU has to go to the buffer, while the content fetched from the buffer is written into the cache, likely into the same location thereon.

The cache blocks each are associated with a field of $n$ presence bits which are all set to 1 when an information block has been stored in the respective storage block of cache 12. For each access made to that block the field of presence bits is decremented by "one", so that after $2^n-1$ accesses the field of presence bits consists of zeros only. This means that the next request concerning that particular block will automatically lead to a "miss" causing access to the same information in a location in the buffer. Please note, that information in the cache is represented usually additionally in the buffer (but not necessarily vice versa). Forcing now an access to the corresponding location in the buffer has the additional purpose of preventing that the particular block in the buffer from becoming endangered as a less and less recently used block. In other words the forced access to a buffer block reduces its availability ranking as it becomes a most recently used buffer block at that point.

As a consequence, there are two criteria for availability of block space in the cache; one is recency of usage, the other one is frequency of usage, whereby the latter takes priority over the former as far as availability is concerned. It should be mentioned here, that the making available of storage space in cache and buffer is not a matter of criticality as far as overall operation is concerned. In other words it is not mandatory to store such block always in buffer and/or cache. Placing an information block into cache and buffer when the CPU has made a read demand (or a write demand in the case of a buffer miss) merely reduces the possibility of subsequent cache and/or buffer misses, but does not "hang up" the machine if not carried out. Thus, space should be made available in buffer and cache by appropriate algorithm so that as few time spans as possible occur in which no space is available in buffer or cache. Making always a block available (and reducing these time spans to zero) is but one possibility. If it is permitted to have no storage space available e.g. in the cache the storage operation is simply not carried out and later demands by the CPU on the same block is not honored by the cache, only by the buffer. Hence, the cache miss rate will be somewhat higher and performance deteriorates somewhat; nevertheless there is no inherent need that storage space must always be available in cache or buffer.

The third aspect to be considered involves transfer of information from buffer to memory. Such a transfer can be made dependent upon the value of an update bit or bits (flag) in each block. When the update flag is set, the buffer may issue a memory request on its own and transfers the updated block to the appropriate memory locations. This does not have to follow immediately a store operation by the CPU that has lead to the buffer block updating. Rather, the transfer to memory can be made additionally dependent on recency of usage, when the block becomes vulnerable to being displaced.

It should be considered here that many memory store and update operations are repetitive without significance to a final result as far as outputting is concerned. Take for example a counting operation in a loop. The counter (software) is updated repeatedly pursuant to repeated execution of the loop. Such a counter does not really have to be transferred to core memory. Hence, if the transfer of the content of the block is in fact deferred until a block has not been used for a long time (presumably because the counting has been completed and the loop has been exited) numerous needless transfer steps to memory can be avoided.

It can readily be seen that the total access times to memory as far as CPU demands is concerned, is drastically reduces so that, in effect, periods of time exist in which no access demand is made to the memory or any particular bank. This in turn permits easy timing as to transfer of information from buffer to memory on a low priority basis.

The update flag rendering the block as a whole immune against being replaced by other information, may nevertheless be associated with but one or two. i.e. not necessarily all of the locations to the word level of that block, so that only the updated word of that block needs to be transferred to the memory and not the entire block. Such a restriction may reduce further the total demands made by the CPU-cache-buffer subsystem to the memory, in units of memory cycles.

The need for that restriction on demands depends on the total demand for memory access expected to be made by that subsystem and by the peripheral equipment. Upon considering the total demand for memory access made by the peripheral equipment, the permissible periods of time available for demands by CPU-cache-buffer subsystem may be sufficiently long to permit indeed the "waste" of transferring entire blocks of memory, with as many memory cycles as a block has words, even though not all word locations have been updated. On the other hand this permissible "waste" can possibly arise only if the memory requests by the CPU are mostly satisfied by cache and buffer on account of a sufficiently large size of either or both.

The transfer of complete blocks between memory and buffer will not incur additional delays or constitute wasted time if the data path for memory read-out as well as for the write-in in the memory is sufficiently wide to operate on a block basis, so that all words of a block are transferred in parallel. In that case, even a block transfer will involve only one memory cycle, and one needs only one update flag per block without designating the updated location further.

One can see, that a combination of features can be used here if in fact multiple memory cycles are tolerable for buffer-memory transfers. Buffer blocks may be larger e.g. twice as large as cache blocks, so that only one half or the other of a buffer block is involved for a full buffer-to-cache block transfer. On the other hand, information may be transferred between memory and buffer in cache block sizes, using as many memory cycles as a buffer block contains cache blocks. For reasons of look ahead, this may actually decrease the demands to be made on the memory and actually reduce buffer misses.

Generally speaking the subsystem CPU-cache-buffer makes demands on the memory only for storing updated information in memory or for extracting from memory information not represented in the buffer. The demand band width resulting therefrom will be considered in conjunction with an access time analysis considered next.

The fourth point to be considered relates to the question of access timing. In a conventional memory, the effective or average access time $e_1$ is given by the access time ($a$) proper within the memory; to this is added the cable and port delay ($d$) as far as transmission of a memory access request from the CPU to the memory is concerned. This delay involves generally the transmission of the access request by the CPU to the memory via, usually, relatively long signal lines, plus the time it takes to decide which bank holds the desired location, plus the average waiting time at the memory port, bearing in mind that the CPU usually has lowest priority (at least some I/O equipment operating within fixed time frames cannot wait without loss of information). Hence $e_1 = a + d$.

By way of example, $a$ may be 650 nanoseconds, $d$ may be 60 nanoseconds minimum, so that $a + d$ is in excess of 700 nanoseconds, more often closer to 3/4 or 4/5 of a microsecond.

The average access time $e_4$ to information generally, in the inventive system, is equal to the sum of the access time to the cache ($c$), the fraction of the buffer access time ($b$) based on cache misses under consideration of the transmission and port delay ($d$) and the fraction of the memory access ($a$) on the basis of buffer misses.

These two relative fractions are expressed in terms of miss rates, with $m$ being the miss rate of a buffer access, i.e. the relative frequency of attempting to access a particular location in the buffer but failing. Analogously, there is a miss rate $m'$ for cache access.

Thus, $e_4 = c + m' (b + d) + ma$

The ratio $e_1/e_4$ gives the improvement of the inventive system over the conventional system.

$$e_1/e_4 = \frac{a + d}{c + m'(b + d) + ma}$$

One can, arbitrarily but rather reasonably postulate a ratio $r = a/b = b/c$, meaning that the access ratio of buffer to cache is the same as the ratio of memory to buffer. While exactitude in this equality is not essential, it expresses at least generally a technology ratio with the implication that the buffer access speed is somewhat in the middle of memory and cache access speeds on the basis of these ratios. Introducing this ratio $r$ in the formula above yields:

$$e_1/e_4 = \frac{r^2 + 1}{mr^2 + m'(r + 1) + 1}$$

For economical reasons one wants to have as small a cache as possible and still obtain a significant improvement ratio $e_4/e_1$ as to access speed. The same is true for the buffer, but clearly the cache should be smaller than the buffer for reasons of cost. Moreover, these formulas are true only, when the memory recovery time is smaller than $1/m (g + c + m'b)$, wherein $g$ is the time it takes the CPU to generate a memory request and address. Clearly, a sufficiently larger buffer ($m>>1$) can meet this condition. From a practical point of view, the buffer should have at least 1000 word capacity to reduce $m$ to 0.1 or smaller.

The cache and buffer sizes, of course, relate directly to the hit-to-miss ratio in each instance. By way of example, a buffer or a cache having the size of 2K words will produce a miss rate of 0.05; for 1K word buffer or cache $m,m' = 0.12$; for a 256 word buffer or cache, $m,m' = 0.3$ and even a buffer or cache as small 64 words produces still only a 50% miss rate.

An analysis of these equations teaches that a slight increase in cache size can be off-set by a significant saving in buffer size for the same $e_1/e_4$ ratio, but only over a certain size range. Nevertheless, the actual choice of buffer and cache sizes will be influenced to a considerable extent by the cost per bit for each of these facilities.

By way of example, for a 2K word buffer ($m = 0.05$) and a 128 word cache ($m' = 0.4$), $e_1/e_4$ is about 5.5 for $r = 5$ corresponding to a 1 microsecond : 200 nanoseconds : 40 nanoseconds access speed ratio a:b:c. 40 nanoseconds access speed for a cache may be a little optimistic, while 1 microsecond for a core memory is rather slow. For a more conservative ratio of $r = 3$, the ratio $e_1/e_4$ is a little over 3 for the same valuves for $m$ and $m'$. $r = e_1/e_4$ 3 will be true also if we use a buffer of half the size, and a cache of twice the size. If we increase the cache further, the performance ($e_1/e_4$) will be better, but the cost will be rather high.

Figure 2:
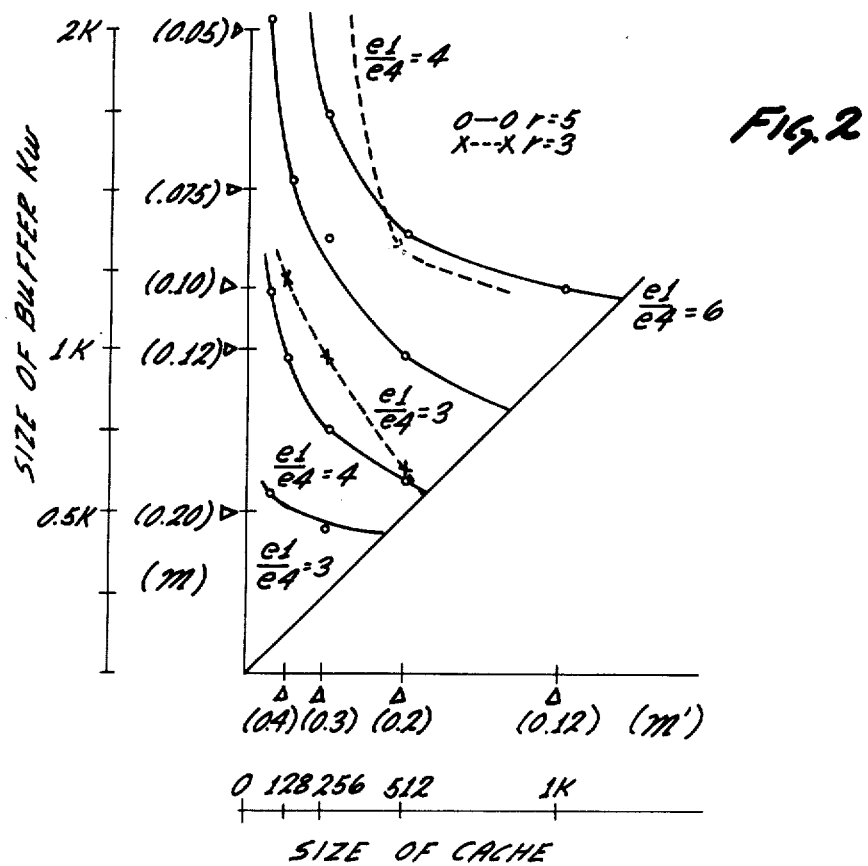
FIG. 2 is a diagram relating buffer and cache sizes to total access times and individual speed ratios.

FIG. 2 shows a family of curves which illustrate these relations. These curves show that a drastic decrease in buffer size will be offset by a small and moderate increase in cache size for a range in which the buffer has at least twice the cache size. On the other hand a reduction of, say, 128 word to 64 word in cache size requires a much larger buffer increase. Considering that presumably the per-bit cost is twice for the cache as compared with the buffer, the sizes should be shifted into a range where the same performance is obtained by changing buffer and cache sizes corresponding to the price ratio; the examples in the preceding paragraph demonstrate this preferred range.

Another aspect to be considered is the access time to core memore, $a$. This access time enters into the performance formula for $e_1/e_4$ only through the attenuation factor $m$. As stated above, a buffer of about 2 kilowords produces a miss rate $m$ of just 5%, so that the average access time extension resulting from these infrequent accesses to a high speed core memory (650 nanoseconds) is only about 32.5 nanoseconds. Using a rather poor core memory of 1 microsecond access time results merely in a 50 nanoseconds extension of the average access time to the core memory.

Conversely, if we assume a buffer of the same size but using rather a poor core memory, and if we increase the cache from 128 words to 256 words and use a buffer with an access time of 300 nanoseconds and assume a 60 nanoseconds port delay, the component ($m' \cdot (b + d)$) in the formula yields $m' \cdot$ 360 in either case but is reduced from 144 to 108 nanoseconds for the assumed modification. Upon considering that memory size does not enter into the picture at all, an increase of the cache size by 128 words can be more than offset in cost saving by a much more economical core memory, but only upon interpositioning the buffer will performance not deteriorate. The cascading is, therefor, the critical aspect.

An interesting comparison can be made between the system as per the invention, and a (single) buffer (e.g. a cache) but with moderate access time ($b$) and being placed in direct vicinity of the CPU. One finds the same performance (identical overall-average access speed) for a 2 kiloword local buffer, as for a 128 word cache with a 1 kiloword memory buffer as per the inventive system. Since for a technology ratio of 3 the cost per bit ratio is about 2:1 as between cache and buffer, the buffer plus cache system is clearly the more economical solution or, for the same cost, one can increase the cache and/or the buffer and gain a correspondingly higher access speed.

It should be mentioned, that a memory buffer alone contributes materially to an improvement of access speed. The access speed can be termed $e_3$ and is given by the formula $$e_3 = b + d + ma.$$

With $m$ being rather small, (e.g. $m = 0.05$ for a 2K word buffer), the component $m$ is insignificant and the average access speed $e_3$ in this case is almost as small as if the entire memory has the access speed of the buffer. For $b = 300$ nanoseconds, $d = 60$ nanoseconds, $a = 1$ microsecond and $m = 0.05$, $ma$ is 50 nanoseconds so that $e_3$ is a little over 400 nanoseconds.

Another important aspect to be considered and resulting from the reduced frequency of memory access demands is this. The combined buffer-memory system yields a capacity of data flow of $1/(b + m (a + d) + g)$ words per second as seen by the CPU (without considering the cache) wherein $g$ is the average time needed by the CPU to generate an address. Conversely, the CPU plus cache system will make demands on memory at a maximum demand rate of $m'/c + m' (b + d) + ma + g$. (please note that $m' < 1$). One can see here, that the direct proportionality with $m'$ shows a drastic decrease in demands made on the ports with increasing cache size, while a large buffer (low $m$) removes the memory access almost completely from influencing the demand band width. In view of the block transfer, not all data actually transferred out of the ports is useful. A conservative estimate is that at least half of the information transferred by block is useful in the sense that it contributes to cache access hits. The demand rate above should be increased by a factor between 2 and 3. Nevertheless the demand on the ports is drastically decreased by even a small cache.

After having described the overall system and its operation, I proceed to the description of some details FIG. 3 shows a portion of cache 12 and here particularly a storage location 12x for a single word. In essence such a location may be a high speed register 20 with access time well below 100 nanosecond. In association therewith is a second register 21 containing the memory address bits to identify the content of register 20 as the one held also in a particular memory location to permit associative addressing in the cache.

It shall be assumed, that a word address can be divided into a block address and into a two-bit within-block address, as each block has four locations to the word level. Hence, the in-block address of each cache location does not have to be and will not be changed and is, therefor, permanently contained in a hard wired section 22 of the address register. The block address portion is register 21 is exchangeable.

Reference numeral 13 refers generally to the address bus on which the CPU sends out address signals for memory requests, and a compare logic 24 determines whether or not an address on bus 13 is the same as the one held in register 22. There is one such compare logic per cache location, each making in effect a logic decision "yes" or "no", respectively called here "hit" and "miss". A "hit" serves as gating signal for a set of data-out gates 25 coupling the register 20 to data bus 14, which leads into the CPU because it is the data path for information demanded by the CPU from memory.

The transfer from a cache location will take place only, if the memory request was actually generated by the CPU for purposes of a memory read operation which is signalled by the CPU via a control line 13-R, accompanying the access request. A gate 26 will block the transfer of data onto bus 14 if the request was not a read request, even if the location 12x has the address of that request.

A cache location such as 20 is actually a replica of a memory location, and a read-from memory demand when made by the CPU is satisfied when a cache location is caused to apply its content to bus 14 in that manner. The output of gate 26, and of all other corresponding gates for the other blocks of the cache may be connected to a nor gate 32 leading to a hit/miss bus 33. Nor gate 32 is connected to all of the respective comparators and can receive a "hit" signal from any one of them. When none of the blocks registers a "hit", bus 33 receives no signal and a transfer circuit 34 is enabled for coupling the address bus 13 as leading from the CPU to cable drivers etc. in circuit 34 for transfer of the address via a (long) bus 13' to the memory ports, so that either the buffer or the memory proper will be accessed.

Additionally, a "hit" as determined by one of the cache comparators, e.g. comparators 24, causes a presence counter 30 associated with the block to which location 12x pertains to be decremented by "1". Also, a hit resets to zero the recency-of access counter 31 for the particular block. Counter 30 contains the so-called presence field which is loaded by or set to a maximum number when the particular location 12x has received new information in a manner to be described more fully below. Counter 30 may have $n$ stages (e.g. $n=3$), with all stages being set to "1" initially so that after $2^n-1$ hits, i.e. successful (read) accesses to location 12x the presence of field counter 30 has reached zero (decimal).

Access to any of the cache locations is permitted only when the request is not made for purposes of a store or write-in operation. If the CPU has made a store demand, a corresponding signal is, of course, developed in the CPU for other purposes, and that signal is also applied to a line 13-w, connecting to all recency-of-access counters and forcing the particular one to count state zero, which pertains to a location whose address comparator would have registered a hit. Presently then, a gate 28 will reset the presence field counter 30 when comparator 24 registers a hit. This resetting, in effect, over rides the accompanying decrement-by-one operation of counter 30 as occurring for any hit. Resetting the presence of field in the case of a write request renders the content of this location in cache 12 obsolete and makes the location available for storage.

Additionally, bus 33 will not receive a "hit" signal on a memory write request regardless of whether or not a "hit" or a "miss" occurred in the cache because nor gate 32 has false inputs only in that case. If not "hit" signal is applied to the bus 33, transfer circuit 34 is enabled to transmit the address to the buffer and memory via bus 13'. Alternatively or additionally, the write request signal in line 13-W can be used to enable the transfer circuit 34 for the address.

In the case of a miss that was not forced but occurred because a read request made by the CPU did not find the respective memory location represented in the cache, the address is transferred additionally within the cache and held in a register 36. This register 36 is common to all cache blocks and pertains to the cache at large. The same is true, of course, for elements 33 and 34. In such a situation it is desirable to store the address until the content of such a (memory or buffer) location can be stored in an available location in the cache; that content will be supplied by buffer 16 or memory 11 to the CPU as demanded, and will arrive shortly, because the CPU when having made a memory read request but encountered a miss in cache 12 proceeded (indirectly) to seek that information from buffer 16 or memory 11 in that the cache (control 34) placed that address on bus 13'. The information furnished by buffer 16 or memory 11 on bus 11 describes the only circumstance under which information is written into the cache. Register 36 may store the block address portion only, because information is furnished to the cache on the basis of complete blocks only. Register 36 applies the address it holds to a bus 35 for gating into one of the block address registers, such as 21, as soon as such block of information is available on bus 14.

The data bus 14 from memory is preferably four words wide, always holding the content of all four locations pertaining to a block. However, the particular portion of bus 14 leading into the CPU may be or'ed from the four word wide bus into a one word wide path as the CPU demands usually only one word per request. The demand for a double word may involve two different blocks so that two sequential word transfers are the normal procedure.

Since the particular location 12x has only an exchangeable block address, its two bit within block address is fixed. Thus, only one particular portion of bus 14 leads to the particular data-in gates 27 for this particular cache location. These gates thus couple one set only of data bus lines 14 to the input side of register 20 corresponding to a particular in-block address. The particular set is one word wide and transfers always only the content of memory locations having one particular combination of the least significant bits of its addresses.

The particular gates 27 are opened only (1) for information supplied to bus 14 by memory 11 or buffer 16 and (2) when the particular block 12x to which location register 20 pertains was found available for storage. The particular write-into-cache operation is under control of logic 18 determining specifically the availability of blocks for storage.

A block is deemed unconditionally available for storage if its presence counter 30 has been reset to or has been counted down to zero. Whenever "zero" has been detected in counter 30 by an appropriate decoder 46, the block address for example, possibly also the content of the location register 20 may be erased. This is not essential, it may suffice to have decoder 46 prevent the response of comparator 24 for forcing a miss. The reason for the availability of a block whose presence field is zero can be two fold as explained thus far; either a write request was made by the CPU involving a location that is represented in the cache; or $2^n-1$ read accesses have been made to a location or locations in that block. However, these reasons are inter-related. In the case of a write request, the information in that block has now become definitely obsolete; if many access requests have been made the information may become "too old" and the corresponding locations in buffer and memory may have been updated e.g. from peripheral equipment; a zero presence field in 30 signifies either fact.

Obsolescence so defined renders the block available for storage; e.g. on a subsequent read request involving the same location, the cache miss logic forces the access request to be transmitted to the buffer because the cache presence field is zero, and the updated information when fetched from the buffer and upon passing on bus 14 is copied into this location (or any other available cache location). The presence field for the location receiving this updated information is then redefined by "ones".

In the case of $2^n-1$ read requests having been made to the same block in the cache, no such access was made to the corresponding block in the buffer. Hence, the recency of use status of that buffer block may have dropped. Thus, the ranking as to non-use of that location in buffer 16 should be updated to indicate continued use of that information by the CPU which is the reason for simulating an absence or miss as far as the cache is concerned and compelling a use of the buffer block with the same content in the buffer.

If more than one block is available for storage in cache 12 because more than one block presence field (30) has been set to zero for one reason or another, one can make an arbitrary decision as to which one is used next. A hard wired priority ranking can be arbitrarily established leading from block to block, analogous to hard wired priority ranking of armed and enabled interrupt channels as disclosed in U.S. Letters Patent No. 3,702,462. In the alternative, one can use that block whose recency-of-use counter 31 has the highest count.

As will be explained shortly and in detail, counter 31 counts access requests made by the CPU, not honored by the particular block, while a request directed to the block resets rank counter 31 to zero. Hence, a high count in counter 31 signifies long non-use of the particular block. This one could use the count state of the several rank counters 31 to resolve ambiguities in the case several presence counters 30 are in the zero state. On the other hand, when none of the presence counters 30 of the several blocks in cache 12 has been placed into the zero state, i.e. there was no write hit, forced miss nor were any of the blocks accessed $2^n-1$ times since the previous cache write-in into a single available block, then the highest count state in the respective counter 31 becomes the sole criterium for availability, and such a high count state operates as the third possibility for forcing a zero state into the presence counter, so that always one block is available.

Each block has a recency-of-block response counter, or better, rank counter 31 which tracks non-use of its respective block as follows: A block when successfully accessed (address comparison hit) opens up a set of gates 41 so that the counter content can be applied to a bus 42. The bus connects to the input of a subtractive comparator 43, there being one per block, while the respective other digital input side of the comparator 43, is provided by the counter 31. Hence, the rank count of a block that registered a hit (regardless of whether it is a permitted read hit or a forbidden write hit as far as actual access is concerned) places its rank count onto an intra cache bus 42, and the subtractive comparators of all other blocks compare their respective rank counts with the one on bus 42.

Those blocks, having registered a "miss", and whose rank count state is below the rank count of the block whose address is the same as the one on bus 13 (hit), will produce a carry or negative sign bit (carry logic 48), and that bit is used to increment the respective counter such as 31 for increasing once more the non-use count thereof. The comparators of those blocks whose count state is above the count of the "hit" block will produce a positive difference, and their rank counters (corresponding to 31) are not incremented, their rank of non-use does not have to be altered.

The rank counter such as 31 of the successfully addressed block is reset to zero by the unconditioned "hit" signal, thereby automatically producing the lowest rank of non-use for that block. However, that hit signal is slightly delayed until the comparison in the several units 43 and rank counting in these other blocks has been completed.

In the case of a complete miss, i.e. if the location identified by an access request of the CPU on bus 13 is not at all represented in the cache, no count number appears on bus 42 and the rank count is not disturbed anywhere. The same is not true in the case of a forced miss because of a write request which for purposes of rank counting was still treated as a hit.

In the case of $2^n-1$ uses a block, its ranking of non-use can be expected to be quite low. Nevertheless for purposes of counting access the last one of the still permitted accesses to that cache location should be treated also as a hit for purposes of non-use counting. It should be noted here that it is more or less arbitrary whether or not one still permits the access to the cache location to be made by the request which caused the presence of field counter 30 to be set to zero. This is immaterial for purposes of rank counting, because the particular cache location will become available for storage, and storing information into a cache location is also treated as a circumstance for setting the rank counter 31 of that block to zero.

It can be seen that the highest rank count number obtainable is the number of blocks minus one. A block having that number is automatically deemed available as the next block into which information can be stored. A decoder 44 responds specifically to the highest count number in the respective counter, such as 31. The highest rank count in a counter 31 as detected in that manner is used to reset the presence field 30 of the particular block. This then is the third circumstance under which the presence field can be set to zero.

The zero state of the counter 30 is detected by the zero detection or decoding circuit 46 which applies a signal to a zero bus line 45. Each block has a gate 47 connected to line 45 to detect whether or not any zero detector in any block has detected a zero state of its respective presence of field counter 30. If that is the case, resetting of the particular presence of field counter 30 associated with the block having highest rank count state at that time is deferred. If no other presence of field counter is in the count zero state the particular block is made available for write-in in that its presence of field in counter 30 is reset to zero.

This then completes the description of the three circumstances under which a block is made available for storage, (1) an attempted write-in request, (2) $2^n-1$ uses of that block, and (3) longest non-use among all cache blocks. Moreover, case (1) and (2) placed the ranking count to zero, whereas situation (3), of course, arises on highest count. These circumstances taken together, and being monitored by counters 30 and 31, do not only provide for availability of cache spaces, but limit the time information is held available in the cache for the CPU without an inspection whether or not the corresponding locations in the buffer have been updated.

With the next read cycle that causes a miss in cache 12, but leaves an address stored in register 36 the information then applied by buffer 16 or memory 11 to bus 14 is gated into that block, whose zero detector 46 has detected zero of the presence of field in 30 for any of the reasons expounded above; data-in gates 27 are opened accordingly (plus the other gates as pertaining to the other three word locations of the block). In addition, the zero detector 46 for the presence of field counter 30 opens gates 37 to set the address held in register 36 into the particular address register 21 to permit subsequent associative addressing. Subsequently, the presence of field bits in counter 30 are all set to "1".

A store-in-cache operation is by necessity preceded by an unsuccessful read attempt resulting in a complete cache miss. This then left all rank counters unmodified. For purposes of rank counting, the storing is treated as an access. A "hit" is simulated by a store operation that places a new address into register 21 and a new word into four locations of which register 20 is one. When information arrives on bus 14 it is accompanied by a control signal, and that control signal together with the gating of the gates 27, 37 of the particular block could be used as a simulated hit to be applied to gates 41 and to the reset input of counter 31.

Such a simulated hit for example causes the highest rank number in the system to appear on bus 42 and all rank counters will be incremented if the availability of that block resulted from longest non-use. In the case of availability of a block for the other two reasons, its rank count may be low at that time, even zero, but the rank counting operation for all other counters proceeds also in regular fashion. It should be noted however, that it is not of immediate significance, whether or not any cache block that is merely being written into assumes the lowest rank as far as non-use is concerned, but it is reasonable to procede on that basis.

No block has ever the same rank, i.e. no block has ever the same number of non-uses, because only one block is accessed at a time, and in an initialization procedure an arbitrary ranking can be established by filling the counters such as 31 with ascending numbers from zero to the highest number in arbitrary selection (or on the basis of the existing hard wire priority for resolving ambiguties as to availability for plural blocks). This for example will be necessary when there is a program change and the cache will be flushed. Upon beginning with different ranks in the stated manner, two blocks can never have the same rank of non-use.

It should be mentioned that the rank-count method for making storage space available is most likely to be used primarily when the cache is rather small, has only a few blocks and the blocks are small in themselves. If the cache is large, it may well suffice to update the cache content only on the frequency of use limit (presence field), dispensing with rank counting. This may lead occasionally to a lack of available storage in the cache, if none of the blocks has been used to the particular limit. The likelihood of occurrance of such a no-vacancy situation in the cache will be reduced by increasing the block size. Saving the rank-count logic and dispensing with the determination of least recent usage may be a significant cost saving when a large cache is used, while the lack of available storage space (requiring a somewhat more frequent buffer access) may hardly deteriorate the performance as to average access time.

It has been shown, that the storage blocks in the cache are made available on the basis of an interplay between rank counting as to non-use and a maximum number of accesses to a block before replacing its content. In the essence, the presence of field (tallying the number of accesses made) was used as primary indicator, with forcing its content to zero when (1) no other block is available on the basis of the $2^n-1$ maximum of accesses and (2) there was an attempted write-in or its rank of non-use is the highest one among all the blocks. A somewhat different mode of interrelation can be used by causing each block which has tallyed maximum use on the basis of presence of field decreminating or which has an address corresponding to a memory write request, to assume highest rank as per its counter 31 while those rank counters with counts from the previous highest to the one which will now assume highest rank count are decremented by one. This way it will be always the counter with highest rank count which is available for the next store-in cache operation when information arrives on bus 14 as a result of a cache miss, forced or regular. Moreover, the blocks available for storage for various reasons will be stacked in their ranking in the upper range of rank counting and automatically made available for storage in that order which however is inverse as to the sequence of becoming available for storage.

The buffer logic is quite similar to the cache logic as far as the layout of each word location and the organization of the locations into blocks is concerned. Elements 20, 21, 22, 24, 25, 26, 27, 32, 33, 34, 35, 36, 37 in FIG. 3 therefor, correspond respectively to elements 50, 51, 52, 54 55, 56, 57, 62, 63, 64, 65, 66, 67 of FIG. 4. Furthermore, elements 41 to 44 and 48 correspond to elements 71 to 74 and 78 except that the latter group of components operates over a larger range of count numbers; the buffer has more blocks than the cache so that counting of non-use proceeds to a higher number in the buffer than in the cache. The following basic differences between buffer and cache are to be considered.

First of all, it should be mentioned that the address comparator 54 of the buffer connects to the continuation of the address bus 13', as it extends through and beyond the memory port, and with the added provision, that an address on bus 13' may also come from the processor 10a in FIG. 1. Whether or not processor 10a has also a cache is optional. The transfer drivers 64, operating when a buffer miss occurs (logic 69), set the address into a bus 13" which leads directly to the respective address registers in memory. For memory driver details please refer to U.S. Letters Patent No. 3,707,705 as representative example. This miss control 62, 63 responds when none of the comparators of the buffer, such as 54, registered a hit.

A cache location was forbidden to be written into except on transfer of information from buffer or memory to the CPU. The situation is different for a buffer location. A store request into a memory location but already represented in the buffer is accompanied by opening the data-in gates 57 of the particular buffer location on a memory write request and for buffer hit (gate 68). Additionally, however, a flag is set (flip flop 80) to indicate that this buffer location has been updated. This means that its content may be different now from the corresponding location in memory (and, possibly in cache 12). Hence, updating of that memory location is necessary before this particular buffer block becomes the least recently used block whose content is about to be replaced. The corresponding cache location, if any, has been eliminated already by the operation of the zero presence field as described.

The update flag 80 can, therefore, be treated in the memory circuit as an access request of low priority, bearing in mind that updating was a use of that block which placed it at the low end of the usage rank in the buffer. At least as many access requests as there are blocks in the buffer will go by before that block can possibly become the least recently used block. A 2 KW buffer with 512 blocks will, therefor encounter at least as many access requests from the CPU to the buffer, under worst case conditions, but much more in total as many requests are satisfied by the cache. Hence, the buffer-to-memory transfer can be handled on the lowest priority basis for memory requests.

As was mentioned above, updating of a particular buffer location may occur repeatedly e.g. pursuant to a counting process within the executed program, which does not have to be made part of the memory content while still in progress. During that program loop the location will be used for each continuation within the loop which resets the rank count of the block to zero each time. Thus, the transfer of any information from buffer to memory could be delayed until the block has achieved a rather high rank of non-use which may occur after the program exited from that loop, so that a memory cycle for transfer of an updated buffer block content to the corresponding location in memory may be carried out only after, for example, the particular block has a relatively high rank such as next to highest rank, or has passed the half-way mark when the highest significant digit in the rank counter was set to "1" which is a simple indicator of rather long non-use.

In the alternative, one could bunch these memory requests by the buffer and to provide for buffer to memory transfers occasionally e.g. when a predetermined number of up-date flags in the buffer have been set. The operation can then be handled analoguously to an I/O transfer from a peripheral equipment data source to memory. This aspect is of some significance, because the buffer is not necessarily used just by the CPU in the indicated manner. Rather, a high priority I/O device such as a RAD may use the buffer also and on the same basis!

It can thus be seen, that various possibilities exist as to the timing of transfer of updated information from buffer to memory. A transfer logic 81 may operate on one of these principles which in the simplest form treats the update flag as equivalent to a CPU access request (possibly delayed until a high rank count has been achieved etc.) and couples the content of the address register 51 via transfer gates 85 and circuit 64 to the address line 13", while the data-out gates 55 couple the location register 50 to the memory write-in buffer register which is part of the conventional memory construction. The control 81 will also reset the update flag as an indication of and when transfer of the updated block to memory has infact been completed.

Unlike the organization of the cache, there is no multibit presence bit field associated with a buffer block. Hence, there is no limitation on the number of access to a buffer block. There is, however, a presence bit associated with each buffer block, held in flip flop 60, which is reset when the recency of use counter has reached the highest number as detected at 74. A zero presence bit indicates that the block is available for being up-dated from memory, particularly for receiving the content of a block to which access was demanded by the CPU but which lead to a miss in cache and buffer.

The resetting of the presence bit flag 60 on maximum rank counting is made dependent on a reset state of the update flag 80. The update flag is reset whenever the content of a updated buffer has been copied into the corresponding memory location. The presence flag is set whenever information is copied anew into the particular buffer location. Such data will appear on bus 82 within the memory-buffer configuration and is accompanied by a control signal 82a for setting the presence flag.

The address of the previous unsuccessful buffer read accessing request is held in store 66 and is gated into the register 51 of the available block together with the distribution of the four information words into the same block, including the one register 50 of location 16x.

The alternative situation for storing information in a buffer location arises when a write request has been made, but resulted in a complete buffer miss. In that case, the address is applied directly from bus 13' to bus 65 via transfer and driver circuit 64 and store 66, and the data word on bus 19 from the CPU is set into the available buffer location. This operation is not an update operation of a buffer block location, but transfers from the CPU into the buffer information for a memory location not yet represented in the buffer. After the buffer write-in into the available memory location, the update flag and the presence flags are both set, so that this information will be transferred to memory in time.

In addition, a memory or request issues by the buffer to call on the remaining words for that block via 13" just as if there was a buffer miss. The data-in gates of the block in buffer 16 just made available by the gating signal from presence flip flop 60 are held open, so that the information on bus 82 can be gated into the block except that the particular data-in gate that was coupled to bus 19 is kept closed in response to the in block-address that was transmitted via bus 13', so that the particular word then provided by the memory is ignored.

It can be seen, that the operation of completing the block content in the buffer and of writing the one word that was furnished by the CPU to the one buffer location into memory can be combined so that only one memory cycle is needed for this two way transfer of information.

For purposes of rank counting the total miss plus write request is treated as a hit, causing the highest rank count to be set into bus 72 for causing all other rank counters to increment their respective counts by "one", while the count of the specific block is reset (or recycled) to zero. The respective gating signal for gates 71 is provided by a coincidence gate 84 responding to the resetting of the presence flag (80=1) as well as to the miss, taken from control 69 because of the total miss. Additionally, the same signal but slightly delayed is applied as reset signal for rank counter 61.

The invention is not limited to the embodiments described above but all changes and modifications thereof not constituting departures from the spirit and scope of the invention are intended to be included.

I claim:

1. In a digital, stored program computer having a random accessible memory and a central processing facility with an information flow path to and from memory, from and to the processing facility including a path for memory addresses to the memory and paths for other information taken from and to be provided to memory locations, the improvement comprising:

a random accessible buffer having a plurality of storage blocks, each block having a plurality of storage locations, each block further having means for storing addresses for identifying the locations in the block, the buffer upon receiving addressing signals corresponding to an address identifying a location in the buffer by its addressing signals providing access to that location, the buffer having significantly less storage space than the memory but significantly faster access to each of its location than to any memory location;

means in the buffer determining a recency of usage ranking among the blocks of the buffer corresponding to the respective last access request made to each block, to obtain a criterium used for determining availability of storage space;

a random accessible cache having a plurality of blocks, each block having a plurality of storage locations, each block further having means for storing addresses for identifying the locations in the block each as a location corresponding to an address and location in the memory and in the buffer as stored therein, the cache upon receiving addressing signals corresponding to an address identifying a location in the cache by its addressing signals providing access to that location, the cache having significantly less storage space than the buffer but significantly faster access to each location than the buffer;

means for establishing representation of availability of storage space in the cache including establishing a limit on the number of accesses to a cache block of the plurality.

means connecting the cache to the processing facility for transmitting to the address storage means in the cache memory addresses for access requests to locations in the cache and for purposes of reading in each instance the content of a location whose stored address corresponds to such memory address, the cache having means for transferring the content of a successfully accessed cache location to the processing facility;

means for causing the memory address provided by the processing facility to be transferred to the buffer if a corresponding location was not found in the cache;

means connected to the buffer for receiving the said memory address as transferred by the last-mentioned means and for applying such address to the address storage means in the buffer, for transferring the content of the successfully accessed buffer location having said address to the processing facility; or for receiving from the processing facility information for storage in the successfully accessed buffer location as defined by the address;

means for causing the memory address provided by the processing facility to be transferred to the memory if a corresponding location is represented neither in the cache nor the buffer for accessing the location, so that the particular memory location having said latter address provides the corresponding information it contains to the processing facility;

means for providing information as provided by the buffer or by the memory to the cache to be stored in a location of the cache determined on the basis of the operation of the means for establishing and including storing the address of such memory location in the means for storing addresses in the cache in association with the latter cache location to render the location addressible by corresponding address signals when provided by the processing facility;

means for providing information as provided by the memory to the buffer to be stored in the buffer and in a location there as determined on the basis of the recency of usage ranking determining means; and means for transferring the content of a buffer location which received information from the processing facility, to the memory independently from the time of receiving such information.

2. In a computer as in claim 1, including means for storing a presence bit field in association with each cache block used to limit access to that block to a predetermined number before forcing access to the block in the buffer having the same address.

3. In a computer as in claim 1, including means in the cache responsive to a store access request made to the cache and involving a location represented in the cache, for forcing a miss in said access and for resetting presence field bits in each cache block to a not-presence state thereby causing said access instead to the buffer, to obtain updating of the same location in the buffer.

4. In a computer as in claim 1, wherein the means in the buffer determining recency of usage ranking includes counter means respectively associated with the blocks for counting use of each block so that the least recently used block is available for storage.

5. In a computer as in claim 1, including means for causing information provided by the processing unit for purposes of storage in the memory to be stored at first in a location of the buffer made available by the recency of usage determining means if the respective location is not yet present in the buffer, the last means providing for subsequent transfer to the memory.

6. In a computer as in claim 1 and including a second processing facility with need for access to said memory, further including a second cache with storage blocks and means for establishing availability of storage, the second processing facility and second cache connected for making access requests to said buffer and said memory when a location is not represented in the second cache.

7. In a computer as in claim 1, wherein each of the two means providing information respectively transfers the content of a block for the respective receiving cache or buffer, which includes the respective location whose content is transferred on the basis of the respective access request by the processor.

8. In a digital, stored program computer having a central processing unit for handling data and instructions, a memory system comprising:

a plurality of random access memories having different access speeds and capacities, a memory of the plurality of relatively high access speed having relatively low capacity, a memory of the plurality having relatively lower access speed having higher capacity accordingly;

means included in each and all memories and respectively capable of responding to the same address signal when a location so defined is represented in the respective memory, and providing access to such a location when the respective address signal is received;

means for controlling the loading of memories of the plurality so that each memory of the plurality having lower capacity than at least one other memory of the plurality contains a subset of the information of that other memory of the plurality having larger capacity;

means for controlling access to the cascaded memory system, by causing an address signal defining a location to be applied sequentially to the means responding to address signals in the several memories, beginning with the memory of fastest access speed and seeking access to the same information in a memory of the plurality of lower access speed if all memories of the plurality of higher access speed do not contain the information sought; and means connecting all memories to the central processing unit whereby the information demanded by the processing unit may be provided directly to the unit from the particular memory of the plurality of highest access speed of those having the information available.

9. In a computer as in claim 8, wherein information taken from a memory of the plurality is transferred also to all memories of respective higher access speed.

10. In a computer as in claim 9, wherein specific criteria are established in each memory as to availability of storage space therein, the criteria including the relative use of the storage space during previous access requests by the central processing unit.

11. In a computer as in claim 8, wherein the relative access speeds of the memories are apart by a multiple larger than 2.

12. In a computer as in claim 8, wherein the transfer of information from a memory of the plurality of lower access speed to a memory of the plurality of higher access speed involves plural information words for any information demanded by the central processing unit.

13. In a digital, stored program computer having a random accessible memory and a central processing facility with an information flow path to and from memory, from and to the processing facility including a path for memory addresses to the memory and paths for other information taken from and to be provided to memory locations, the improvement comprising:

a random accessible buffer having a plurality of blocks, each block having a plurality of multi-bit storage locations, each block further having means for storing addresses for identifying the locations in the block each as a location corresponding to an address and location in the memory, the buffer upon receiving addressing signals corresponding to an address identifying a location in the buffer by its addressing signals providing access to that location, the buffer having significantly less storage space than the memory but significantly faster access to each location than to any memory location;

a random accessible cache having a plurality of blocks, each block having a plurality of multi-bit storage locations, each block further having means for storing addresses for identifying the locations in the block each as a location, corresponding to an address and locations in the memory and in the buffer as stored therein, the cache upon receiving addressing signals corresponding to an address identifying a location in the cache by its addressing signals providing access to that location, the cache having significantly less storage space than the buffer but significantly faster access to each location than the buffer;

means connecting the cache to the processing facility for transmitting first to the cache memory addresses as access requests to locations in the cache, for reading in each instance the content of a location whose stored address corresponds to such cache memory address, the cache having means for transferring the content of a successfully accessed cache location to the processing facility;

means for causing the memory address provided by the processing facility to be transferred to the buffer if a corresponding location was not found in the cache;

means connected to the buffer for receiving the said memory address as transferred by the last-mentioned means and for transferring the content of a successfully accessed buffer location to the processing facility, said means also capable of receiving from the processing facility information for storage in a successfully accessed buffer location as defined by the address irrespective of whether or not that location is also represented in the cache;

means for causing the memory address provided by the processing facility to be transferred to the memory if a corresponding location is not represented in the cache and in the buffer, so that the particular memory location provides information to the processing facility;

means for selectively replacing the content and address information of locations in the cache and in the buffer with information taken from the memory; and means for transferring the content of a buffer location which received information from the processing facility, to the memory subsequently to receiving such information.

14. In a computer as in claim 13 including means defining a presence field for each cache block for determining presence of information in the block but being reset to signify absence of that information if the central processing facility requested access to a location in that block for storage or if a predetermined number of accesses have been made to that block.

15. In a computer as in claim 13, wherein the means for replacing includes means in the cache and means in the buffer, respectively for storing information provided by the memory to the processing facility, into the cache and into the buffer, the means in the cache being operated to store information in the cache as provided by the buffer to the processing facility, the means in the cache and the means in the buffer each including means for respectively rendering locations available for such storing.

16. In a computer as in claim 15, wherein the means for replacing includes further means to independently transfer additional information to the cache and to the buffer for respectively filling a block therein, such information being taken from the memory or from the buffer and from additional addressible locations therein.

17. In a computer as in claim 13, including means for establishing criteria for availability of storage space in the buffer to permit storage of information taken from the memory in a buffer block.

18. In a computer as in claim 17, wherein the means for establishing criteria of availability of buffer space includes counter means respectively associated with the blocks for counting use of the respective block, so that a least recently used block is available for storage.

19. In a digital, stored program computer having a random access memory system and a central processing facility with an information flow path to and from the memory system, from and to the processing facility including a path for memory addresses to the memory system and paths for other information taken from and to be provided to locations in the memory systems, the computer having additional facilities for updating the information in the memory system independently from the central processing facility, the improvement comprising:

a random accessible cache having a plurality of blocks, each block having a plurality of multi-bit locations, each block further having means for storing addresses for identifying the locations in the block each as a location corresponding to an address and locations in the memory system, the cache upon receiving addressing signals corresponding to an address identifying a location in the cache by its addressing signals providing access to that location, the cache having significantly less storage space than the memory system but significantly faster access to each location than the memory system;

first means connecting the cache to the processing facility for transmitting to the adress storage means in the cache memory addresses as access requests to locations in the cache, for reading in each instance the content of a location whose stored address corresponds to such memory address, the cache having means for transferring the content of a successfully accessed cache location to the processing facility;

second means for causing the memory address provided by the processing facility to be transferred to the memory system if a corresponding location is not represented in the cache, for accessing the location so that the particular memory location having said latter address provides information it contains to the processing facility;

third means for replacing the content of locations in the cache with a subset of information taken only from the memory by operation of the second means;

fourth means connected to the memory for receiving a memory address and for receiving from the processing facility information for storage in a memory location as defined by the address, independently from whether or not that location is represented in the cache; and means for limiting the number of accesses to a location in the cache and upon indication that the limit has been reached forcing access instead to the corresponding location in the memory system by operation of the first means.

20. In a computer as in claim 19, the means for limiting including means defining a presence field for each cache block for signifying presence of information in the block but being reset to signify absence of that information if the central processing facility requested access to a location in that block for storage or if a predetermined limit of number of accesses have been made to that block.

21. In a digital, stored program computer having a random access memory, a central processing facility and additional processing facilities each having information flow paths to and from memory, including a path for memory addresses to the memory and paths for other information taken from and to be provided to memory locations, further including a port system for controlling access to the memory, the processing facilities connected to the port system for seeking access to the memory independently from one another, the improvement comprising:

a random accessible buffer located between the memory and the port system and having a plurality of blocks, each block having a plurality of locations, each block further having means for storing addresses for identifying the locations in the block each as a location corresponding to an address and location in the memory, the buffer upon receiving addressing signals corresponding to an address identifying a location in the buffer by its addressing signals providing access to that location, the buffer having significantly less storage space than the memory but significantly faster access to each location than to any memory location;

first means for causing a memory address provided by either of the processing facilities to be transferred to the buffer through the port;

second means connected to the buffer for receiving the said memory address as transferred by the last-mentioned means and for transferring the content of a successfully accessed buffer location to the respective processing facility, or for receiving from the respective processing facility information for storage in a successfully accessed buffer location as defined by the address;

third means for causing the memory address provided by the processing facility for a demand of information from the location identified by that address to be transferred to the memory if a corresponding location is not represented in the buffer, so that the particular memory location provides information to the respective processing facility;

fourth means for updating the content of a group of locations in the buffer with information taken from the memory when provided by the buffer to the respective processing facility by the third means; and means for transferring the content of a buffer location which received information from the processing facility, to the memory independently from the time of receiving such information.

22. In a computer as in claim 21 and including between at least one of the facilities and the port system, a random accessible cache having a plurality of blocks, each block having a plurality of multi-bit locations, each block further having means for storing addresses for identifying the locations in the block each as a location corresponding to an address and locations in the memory system, the cache upon receiving addressing signals corresponding to an address identifying a location in the cache by its addressing signals providing access to that location, the cache having significantly less storage space than the memory system but significantly faster access to each location than the memory system;

first means connecting the cache to the processing facility for transmitting to the address storage means in the cache memory addresses as access requests to locations in the cache for reading in each instance the content of a location whose stored address corresponds to such memory address, the cache having means for transferring the content of a successfully accessed cache location to the processing facility; and second means for causing the memory address provided by the processing facility to be transferred to the port system if a corresponding location is not represented in the cache for accessing the location in the cache for accessing the location in the memory or in the buffer so that the particular memory location in the memory or in the buffer having the latter address provides information it contains to the processing facility, a memory address for accessing a location for purposes of storing information provided by the respective processor bypassing the cache without access attempt and being applied to the port system.

23. In a computer as in claim 21, including means for establishing criteria for availability of storage space in the buffer to permit storage of information taken from the memory in a buffer block.

24. In a computer as in claim 17, wherein the means for establishing criteria of availability of buffer space includes counter means respectively associated with the blocks for counting use of the respective block, so that a least recently used block is determined available for storage.

25. In a digital, stored program computer having a random accessible memory and a central processing facility with an information flow path to and from memory, from and to the processing facility including a path for memory addresses to the memory and paths for other information taken from and to be provided to memory locations, the improvement comprising:

a random accessible buffer having a plurality of storage blocks, each block having a plurality of storage locations, each block further having means for storing addresses for identifying the locations in the block each as a location corresponding to an address and location in the memory, the buffer upon receiving addressing signals corresponding to an address identifying a location in the buffer by its addressing signals providing access to that location, the buffer having significantly less storage space than the memory but significantly faster access to each of its location than to any memory location;

a random accessible cache having a plurality of blocks, each block having a plurality of storage locations, each block further having means for storing addresses for identifying the locations in the block each as a location corresponding to an address and location in the memory and in the buffer as stored therein, the cache upon receiving addressing signals corresponding to an address identifying a location in the cache by its addressing signals providing access to that location, the cache having significantly less storage space than the buffer but significantly faster access to each location than the buffer;

means connecting the cache to the processing facility for transmitting to the address storage means in the cache memory addresses for access request to locations in the cache and for purposes of reading in each instance the content of a location whose stored address corresponds to such memory address, the cache having means for transferring the content of a successfully accessed cache location to the processing facility;

means for causing the memory address provided by the processing facility to be transferred to the buffer if a corresponding location was not found in the cache;

means connected to the buffer for receiving the said memory address as transferred by the last-mentioned means and for applying such address to the address storage means in the buffer, for transferring the content of a successfully accessed buffer location having said address to the processing facility; or for receiving from the processing facility information for storage in a successfully accessed buffer location as defined by the address if represented in the buffer, a buffer location being made available for storage of the received information including storage of the respectively associated address;

means for causing the memory address provided by the processing facility to be transferred to the memory if a corresponding location is represented neither in the cache nor the buffer for accessing the location, so that the particular memory location having said latter address provides information it contains to the processing facility;

first and second means for establishing representation of availability of storage space respectively in the cache and in the buffer on the basis of frequency of usage and access to locations therein;

means for providing information related to a location as provided by the buffer or by the memory together with information related to additional locations, to the cache to be stored in a block of locations of the cache determined on the basis of the operation of the first means for establishing, and including storing the address of such memory locations in the means for storing addresses in the cache in association with the latter cache locations to render each of the locations in that block addressible by corresponding address signals when provided by the processing facility; and means for providing information of a location as provided by the memory to the buffer to be stored in the buffer together with additional information for a buffer block and in locations therein as determined on the basis of the operation of the second means for establishing for storing an addressible block in the buffer accordingly.

26. In a digital, stored program computer having a random access memory, a central processing facility and additional processing facilities each having information flow paths to and from memory, from and to the processing facilities including a path for memory addresses to the memory and paths for other information taken from and to be provided to memory locations, further including a port system for controlling access to the memory, the processing facilities connected to the port system for seeking access to the memory independently from one another, the improvement comprising:

a random accessible buffer located between the memory and the port system and having a plurality of blocks, each block having a plurality of locations, each block further having means for storing addresses for identifying the locations in the block each as a location corresponding to an address and location in the memory, the buffer upon receiving addressing signals corresponding to an address identifying a location in the buffer by its addressing signals providing access to that location, the buffer having significantly less storage space than the memory but significantly faster access to each location than to any memory location;

first means for causing a memory address provided by either of the processing facilities to be transferred to the buffer through the port;

second means connected to the buffer for receiving the said memory address as transferred by the last-mentioned means and for transferring the content of a successfully accessed buffer location to the respective processing facility;

third means for receiving from the respective processing facility information for storage in an address independently of whether or not the location so identified is represented in the buffer;

fourth means for causing information as received by the third means to be stored in the buffer in the location identified by the address in the buffer or if not present, in a location elsewhere in the memory system subsequently identified by that address;

fifth means for causing the memory address provided by the processing facility for a demand of information from the location identified by that address to be transferred to the memory if a corresponding location is not represented in the buffer, so that the particular memory location provides information to the respective processing facility;

sixth means for replacing the content of locations in the buffer with a subset of information taken from the memory when provided to the respective processing facility by the third means; and means for transferring the content of a buffer location which received information from the processing facility, to the memory subsequently to the time of receiving such information.

27. In a computer as in claim 26, and including a random accessible cache having a plurality of individually addressable locations including address storage means for replacing the address for a location by another one, the cache disposed between one of the processing facilities and the port system and receiving memory access requests from that processing facility for reading the content of a memory location, prior to transfer of that request to the port system;

means for transferring an access request from the processing facility to the port system if the access in the cache was unsuccessfull;

means for storing together with the memory address information as received by operation of the second means or of the fifth means; and means in the cache to render a location available for storage on the basis of frequency of usage of any location therein.

* * * * *

UNITED STATES PATENT AND TRADEMARK OFFICE
CERTIFICATE OF CORRECTION

PATENT NO. : 3,938,097
DATED : February 10, 1976
INVENTOR(S) : Reaman Paul Niquette, III It is certified that error appears in the above-identified patent and that said Letters Patent are hereby corrected as shown below:

Cover page, in the line marked "[75] Inventor:", change the name to read: --REAMAN PAUL NIQUETTE, III--.

Signed and Sealed this

Twenty-fourth Day of August 1976

[SEAL]

Attest:

RUTH C. MASON
*Attesting Officer*

C. MARSHALL DANN
*Commissioner of Patents and Trademarks*